United States Patent [19]

Morton et al.

[11] Patent Number: 5,002,406
[45] Date of Patent: Mar. 26, 1991

[54] SEALING STRUCTURE FOR A SPHERICAL BEARING ASSEMBLY

[75] Inventors: Jerrald R. Morton, Aurora; James P. Johnson, Sugar Grove, both of Ill.

[73] Assignee: Emerson Electric Co., St. Louis, Mo.

[21] Appl. No.: 481,958

[22] Filed: Feb. 20, 1990

[51] Int. Cl.$^5$ .................................. F16C 33/76
[52] U.S. Cl. ................................. 384/477; 384/482; 384/558
[58] Field of Search ............... 384/145, 477, 480–485, 384/488, 489, 495–498, 558

[56] References Cited

U.S. PATENT DOCUMENTS

| | | | |
|---|---|---|---|
| 2,619,369 | 11/1952 | Williams | 277/182 |
| 3,187,591 | 6/1965 | Johnson | 384/558 X |
| 3,893,735 | 7/1975 | Brenner | 384/145 |
| 3,897,120 | 7/1975 | Riegler et al. | 384/482 |
| 3,951,783 | 4/1976 | Cochran | 384/482 |
| 4,093,324 | 6/1978 | Carrigan | 384/480 |
| 4,537,519 | 8/1985 | LaRou et al. | 384/478 |
| 4,755,067 | 7/1988 | Asberg | 384/482 |
| 4,872,770 | 10/1989 | Dickinson | 384/484 |

Primary Examiner—Thomas R. Hannon
Attorney, Agent, or Firm—Polster, Polster and Lucchesi

[57] ABSTRACT

A seal arrangement for sealing at least one side of an internally self aligning, adjustable bearing assembly having inner and outer race rings with the bearing disposed therebetween including a pair of spaced discs, each having one end portion extending in spaced overlapping opposed relation with the other shaped and positioned to provide a seal capable of accommodating bearing float and axial misalignment with the other end secured in fast engaging relation with one of the spaced opposed inner and outer race rings.

25 Claims, 5 Drawing Sheets

SEALING STRUCTURE FOR A SPHERICAL BEARING ASSEMBLY

BACKGROUND OF THE INVENTION

The present invention relates to a sealing structure for a bearing assembly and more particularly to a sealing structure for a spherical bearing assembly which includes an inner and outer race with spherical bearing means disposed therebetween, the spherical bearing assembly being adaptable for mounting a rotatable shaft member.

Bearing sealing structure which includes overlapping, spaced seal support members with a compressible seal disposed therebetween is generally well-known in the bearing art, attention being directed to U.S. Pat. Nos. 2,619,369, issued to A. H. Williams on Nov. 25, 1952; 3,897,120, issued to E. Riegler, et. al. on July 29, 1975; and 3,951,783, issued to T. E. Cochran on Apr. 20, 1976, all three of which patents teach such a general arrangement but in each of which at least a portion of the bearing sealing structure is fixed to the bearing housing and in which there is consequently limited, if any, accommodation for bearing linear or axial float, even though U.S. Pat. No. 2,619,369 does teach limited accommodations for angular misalignment. In this regard, attention is further directed to U.S. Pat. Nos. 3,893,735, issued to A. Brenner on July 8, 1975, and 4,755,067, issued to S. Asberg on July 5, 1988, both of Which teach patented bearing sealing structures which allow for axial float of the bearing assembly with Pat. No. 3,893,735, also allowing for angular misalignment. However, the earlier Pat. No. 3,893,735 requires a special housing with varying adjusting spring seal contact pressure and both of these two patents provide limited misalignment accommodation. Finally, attention is directed to the later issued U.S. Pat. Nos. 4,537,519, issued to A. M. LaRou on Aug. 27, 1985 and 4,872,770, issued to T. W. Dickinson on Oct. 10, 1989, both of these patents teaching bearing seals which can accommodate for linear or axial misalignment but neither including the desirable feature of simultaneously accommodating for angular misalignment.

In accordance with the present invention, a unique and novel sealing structured arrangement for a bearing assembly is provided which accommodates readily and simultaneously for both axial or lineal misalignment and angular misalignment independent of the bearing housing. The unique bearing assembly sealing structure of the present invention is both straightforward and economical to manufacture and assemble, requiring a minimum of parts without requiring special housing structure and also being capable of ready use in industry standard straight-through bored or recessed housings. In addition, the present invention provides a bearing assembly sealing structure having misalignment capabilities larger than the conventionally allowed bearing assembly misalignment capabilities with concomitant constant sealing pressure during bearing assembly misalignment—in either or both axial and angular misalignment bearing assembly conditions. The novel sealing structure of the present invention further serves as a contaminant flinger, as well as a sealing structure, the sealing structure being readily fixed to the bearing assembly race rings independent of the bearing assembly housing and permitting constant sealing pressure without requiring adjustable springs in an attempt to maintain desired constant sealing pressures.

Various other features of the novel sealing structure of the present invention will become obvious to one skilled in the art upon reading the disclosure set forth herein.

SUMMARY OF THE INVENTION

More particularly, the present invention provides a unique and novel structural arrangement for sealing at least one side of an internally self-aligning bearing assembly mounted to the inner periphery of a recessed housing, the self-aligning bearing assembly including axially extending and concentrically disposed spaced inner and outer race rings having bearing means disposed between opposed inner faces of the race rings comprising: a pair of concentrically disposed sealing members extending from opposite directions along at least one side of the bearing assembly, the sealing members being shaped to each have one end portion in fast relation with one of the spaced race rings and an opposite end portion extending in overlapping opposed face moveable relation relative an end portion of the other sealing member, the sealing members and end portions being sized, shaped and relatively positioned to provide a sealing arrangement therebetween along one side of the bearing assembly capable of accommodating a preselected limit of bearing assembly axial and angular misalignment. The present invention further provides a unique compressible bearing assembly sealing arrangement with the overall sealing arrangement being positionable in mirror-image relation on opposed sides of a bearing assembly. In addition, the present invention provides several novel modified sealing structures for press-fitting or otherwise fastening radially extending sealing members in the form of sealing discs to adjacent race rings, the sealing structures being adaptable to various types of spherical bearing assemblies including ball bearing assemblies of the double row type.

It is to be understood that various changes can be made by one skilled in the bearing assembly art to one or more of the several parts of the apparatus disclosed herein without departing from the scope or spirit of the present invention.

BRIEF SUMMARY OF THE DRAWING

Referring to the drawings which disclose one advantageous embodiment of the present invention and several modifications thereof.

DETAILED DESCRIPTION OF THE DRAWINGS

Figure 1:
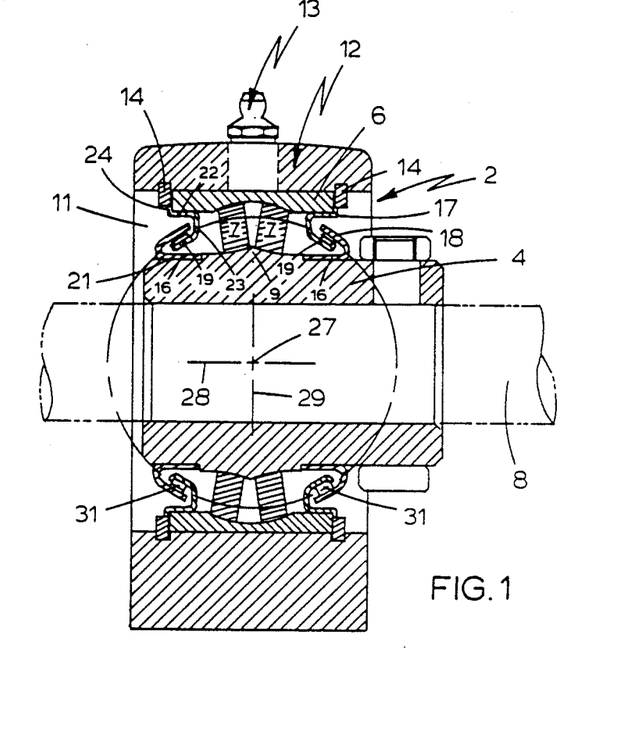
FIG. 1 is a transverse sectional view of a double row spherical bearing assembly disposed within a recessed housing for supporting a rotatable shaft extending within the spherical bearing assembly, the bearing assembly incorporating a novel bearing assembly sealing arrangement in accordance with the present invention, showing by dotted line representation the determination of the common center of curvature for the spaced overlapping spherical segments and the seal ring therebetween of the inventive bearing assembly sealing arrangement.
Figure 2:
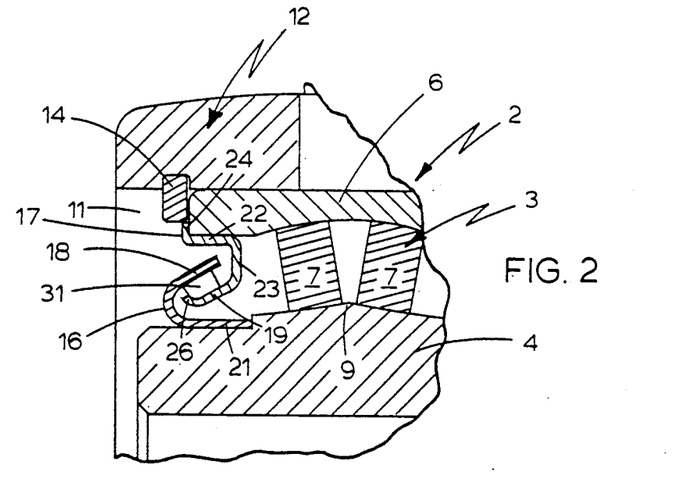
FIG. 2 is an enlarged transverse sectional view of a portion of the assembly of FIG. 1.

Referring to FIGS. 1 and 2 of the drawings, an inventive sealing assembly structure 2 for an internally self aligning spherical bearing assembly 3 is disclosed. The internally self aligning bearing assembly 3 includes axially extending and concentrically disposed spaced inner and outer race rings 4 and 6 respectively with two spaced rows of spherical bearings 7 disposed between the opposed appropriately contoured faces of the inner and outer race rings 4 and 6 respectively. The inner race ring 4 which can be fixed to a rotatable shaft 8 (disclosed only in FIG. 1 of the drawings by some suitable means such as by press fitting), is provided along its outer face with a longitudinally extending, centrally apexed protuberance 9 contoured appropriately as one bearing seat for the spaced rows of spherical bearings 7 with the inner face of outer race ring 6 being contoured appropriately as the other opposite seat for the spaced rows of bearings 7, the spherical bearing assembly being capable of internal self alignment within desirable preselected limits for angular misalignment of shaft 8. The outer race ring 6 is sized to conform with a through recess 11 in housing 12, this housing 12 being provided with a suitable lubrication fitting broadly disclosed by reference numeral 13. It is to be understood that the outer peripheral surface of outer race ring 6 is sized to allow lineal or axial movement of the ring within the recess 11 of housing 12 and the inner peripheral surface of outer ring 6 can be contoured to provide an appropriate outer seat for the spaced rows of spherical bearings 7. Further the axial or linear movement of the outer race ring 6 within recess 11 of housing 12 can be limited by appropriate stop means which can be in the form of spaced annular snap rings 14 which can be of a suitable flexible steel adopted to engagingly nest in preselectively spaced grooves located along the recess defining inner periphery of housing 12 to be on either lateral side of outer race ring 6 of bearing assembly 3.

To seal at least one side of bearing assembly 3 disposed in recess 11 of housing 12 under certain conditions and, advantageously, in most conditions to seal both sides thereof, a pair of concentrically disposed sealing members made from a suitably selected thin, firm, but shapeable material such as stamped steel to be in the form of inner and outer sealing discs 16 and 17 respectively are shaped and arranged to each have one end portion in fast relation with one of the spaced inner and outer race rings 4 and 6 respectively. An opposite end portion of each sealing disc of the sealing disc pair extends in overlapping opposed moveable facing relation relative the companion end portion of the other sealing disc, the disc members 16, 17 extending from opposite directions being so sized and the overlapping end portions so shaped and relatively positioned as to provide a sealing arrangement therebetween along one side of bearing assembly 3 capable of accommodating a preselected limit of both bearing assembly axial and angular misalignment.

As can be seen particularly in FIG. 1 of the drawings, spaced sealing disc pairs 16 and 17 can be arranged in mirror-image spaced relation substantially within the inner faces of the spaced inner and outer race rings 4 and 6 respectively to each extend along opposite sides of the spaced rows of spherical bearings from opposite directions. Each disc of each inner and outer disc pair 16, 17 is shaped to include an end portion 18, 19 respectively. These end portions 18 and 19 are in an overlapping concentrically disposed preselectively spaced relation with each other. The opposite end portions 21, 22 of each inner and outer disc pair 16, 17 respectively are each fastened, advantageously in press-fit relation, With one of the two spaced opposed inner and outer race rings 4 and 6 respectively. In this regard, it is to be noted that outer disc 17 fastened to the outer race ring 6 including end portions 19 and 2 is of substantially U-shaped cross section with its base leg 23 between end portions 19 and 22 extending substantially normally to and between the spaced opposed inner faces of the spaced, opposed inner and outer race rings 4 and 6 respectively. One side leg of the U-shaped cross-section which comprises part of end portion 22 extends along the inner face of outer race ring 6 and is turned at the extremity 24 to extend along the side of outer race ring 6 in press-fit relation with such outer race ring 6. The other side leg of the U-shaped cross-section which comprises part of the other end portion 19 of outer disc 17 and which serves as an overlap end portion 19 includes a turned extremity 26. This turned extremity 26 serves to limit the minimal spacing between overlapping end portions 18 and 19 of inner and outer sealing discs 16 and 17 respectively, and further serves as a positioning device for an annular sealing ring 31 described hereinafter. The inner sealing disc 16 on the other hand, is of V-shaped cross-section with one leg 18 thereof serving as overlapping end portion, overlapping with end portion 19 of sealing disc 17. The other leg 21 of V-shaped sealing disc 16 is fastened to the outer surface of inner race ring 4, advantageously by press-fitting with the extremity thereof abutting against the side of the apexed protuberance 9 which serves as one seat for spherical bearings 7.

It is to be noted from the drawings and in accordance with one feature of the present invention that the overlapping end portions 18 and 19 of inner and outer sealing discs 16 and 17 respectively are in the form of concentrically disposed spaced spherical segments of a circle having differing radii with a common center (illustrated by reference numeral 27 in FIG. 1), falling on the axis of rotation (illustrated by reference numeral 28 in FIG. 1) of bearing assembly 3 and, of course, shaft 8 when in normal position, the center point 27 of the differing radii being determined by line 29 extending midway between the rows of spherical bearing 7 normally to the axis of rotation, or line 28. Since spaced overlapping end portions 18 and 19 are formed as spherical segments with a common center point 27, as determined in the manner described, angular displacement or misalignment of the axis of rotation of shaft 8 does not disturb the spacing between these overlapping spherical segments 18 and 19, nor does axial or linear movement of the bearing assembly 3. Referring to FIGS. 1 and 2 of the drawings, it can be seen that an annular sealing ring 31, which advantageously can be of a suitable compressible material, such as felt, can be provided between the space determined by spaced overlapping end portions or spherical segments 18 and 19 with constant pressure being placed o the sealing ring 31 regardless of angular misalignment. It of course is to be understood that, advantageously, annular sealing ring 31 is of uniform cross-sectional thickness and is compressible so that it conforms to spherical segments 18 and 19, as determined for the spherical segments or overlapping end portions 18 and 19 but with a different radius falling intermediate the differing radii of the spherical segments or overlapping end portions 18 and 19.

Figure 3:
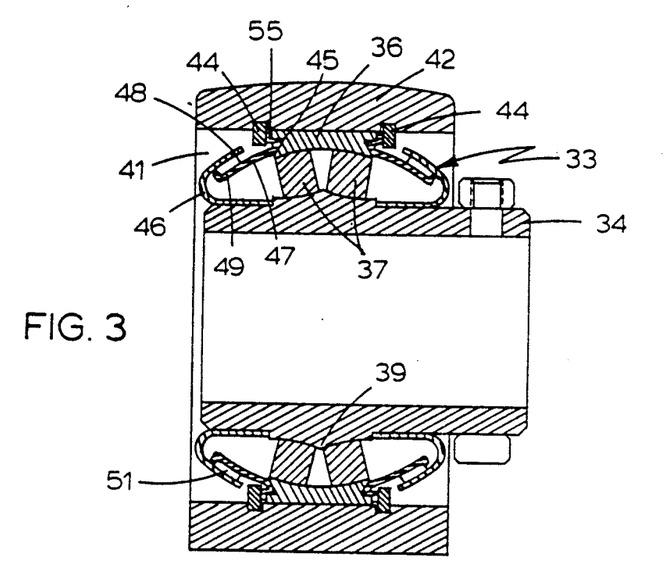
FIG. 3 is a transverse sectional view of a double row spherical bearing assembly disposed within a recessed housing for supporting a rotatable shaft (not disclosed), the bearing assembly incorporating a modified outer race ring and the sealing structure incorporating a modified overlapping spherical segment in accordance with the present invention.
Figure 4:
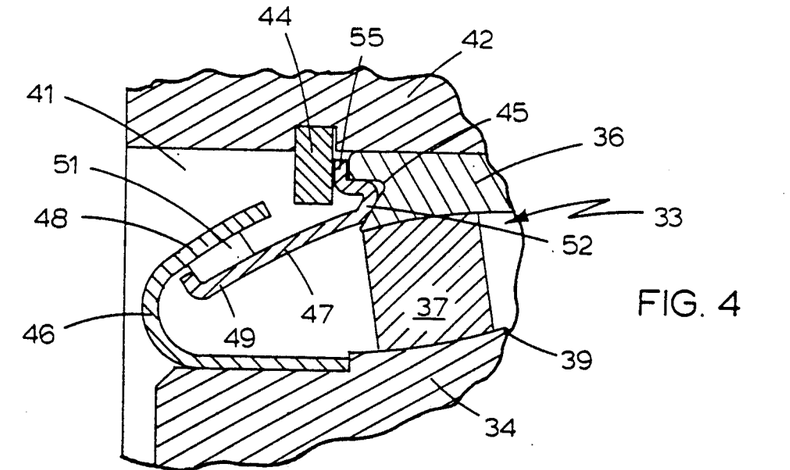
FIG. 4 is an enlarged transverse sectional view of a portion of the assembly of FIG. 3.

Referring to FIGS. 3 and 4 of the drawings, a modified embodiment of the present invention is disclosed wherein a bearing assembly 33 similar in overall assembly arrangement to bearing assembly 3 is disclosed to include spaced, opposed inner race ring 34 and outer race ring 36 with the facing opposed surfaces thereof adapted to provide bearing seats for the spaced rows of spherical bearings 37, the outer surface of inner race ring 34 being provided with an apexed protuberance 39 similar to the protuberance 9 of inner race ring 4 described above. Like above described bearing assembly 3, bearing assembly 33 is mounted in recess 41 of housing 42 to receive a shaft (not disclosed), the bearing assembly 33 also being capable of accommodating for both linear or axial and angular misalignment in a manner similar to that of aforedescribed bearing assembly 3. In this regard, it is to be noted that suitable spaced annular snap rings 44 are located in preselectively spaced grooves in recessed housing 42 on either side of outer race ring 36 to limit linear or axial displacement of this outer race ring 36 and to also serve to limit movement of an extremity of an outer sealing disc 47 of an inner and outer sealing disc pair 46, 47 respectively described hereinafter. It further is to be noted that outer race ring 36 is longitudinally much shorter than companion spaced inner race ring 34 and is provided with notches or indentations 45 on opposite lateral side walls thereof, each notch 45 serving to nestingly receive the corner edge of the outer sealing disc 47 of a sealing disc pair 46, 47 mounted in mirror image relation on either side of bearing assembly 34.

Sealing disc pair 46, 47 is in most respects similar to the sealing disc pair of FIGS. 1 and 2, the inner disc being of V-shaped cross-section and the outer disc being of U-shaped cross-section to each include an overlapping end portion 48 and 49 respectively spaced apart to accommodate a sealing ring 51 with all being spherical segments of differing radii having a common center point determined in the same manner as the embodiment of FIGS. 1 and 2. However, in the U-shaped cross-section of outer disc 47 the base leg serves as the overlapping end portion 47 and is longer than the spaced opposite overlapping end portion 48, being turned adjacent the notched lateral side of outer race ring 36 so that the adjacent edge thereof serves as a longitudinally extending edge 52 configured and shaped to nestingly engage with the notch 45 in the lateral side of outer race ring 36 with the extremity 55 of such turned portion paralleling the side face of annular snap ring 44 to be positioned therebetween.

Figure 5:
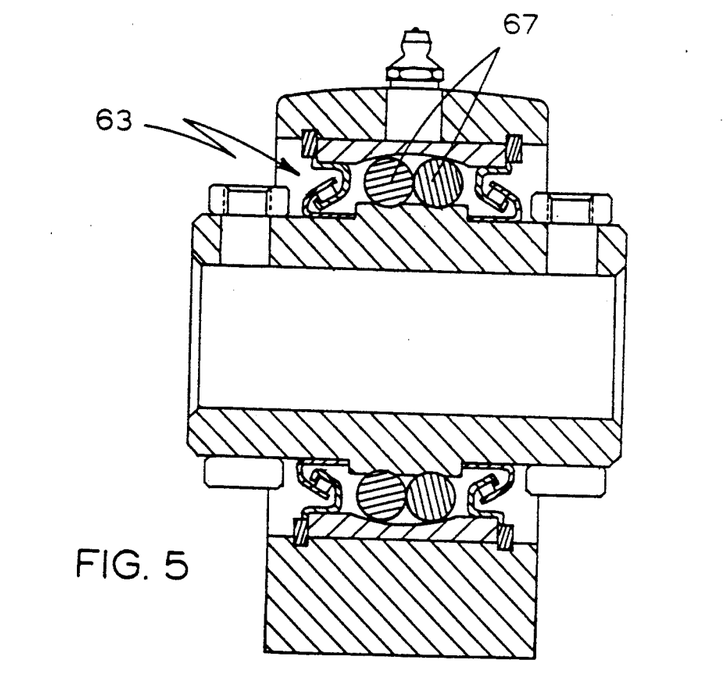
FIG. 5 is a transverse sectional view of a double row self aligning bearing assembly sealing arrangement similar to that of FIGS. 1 and 2, the bearing assembly incorporating a double row of ball bearings.
Figure 6:
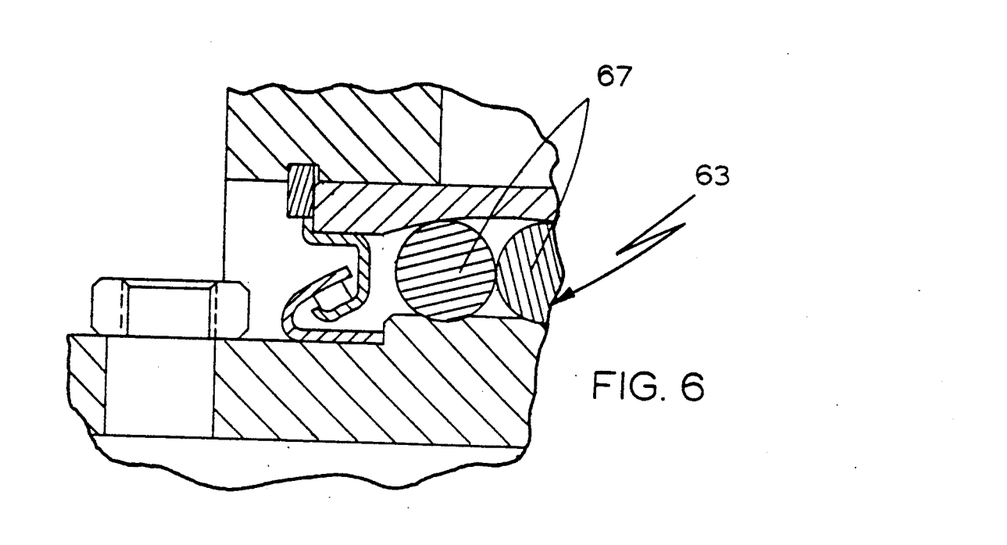
FIG. 6 is an enlarged transverse sectional view of a portion of the assembly of FIG. 5.
Figure 9:
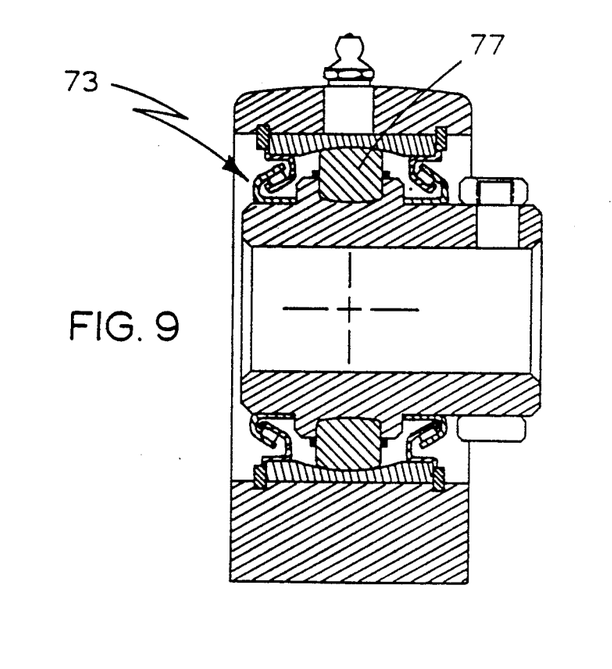
FIG. 9 is a transverse sectional view of a single row spherical roller bearing assembly sealing arrangement similar to that of FIG. 1 and 2, except incorporating only one row of spherical rollers.
Figure 10:
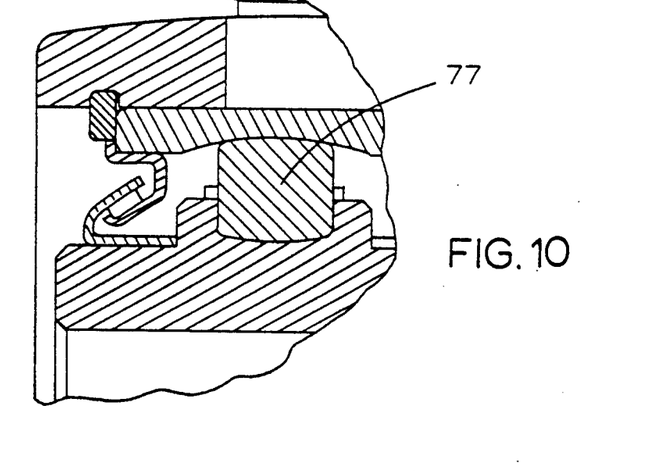
FIG. 10 is an enlarged transverse sectional view of a portion of the assembly of FIG. 9.

Referring to FIGS. 5 and 6 of the drawings, it can be seen that bearing assembly 63 can be sealed in the same manner as the bearing assembly sealing embodiments above discussed, the sealing embodiment disclosed being shown to be like that of FIGS. 1 and 2. It is to be noted that this bearing assembling includes a spaced double row of ball roller bearings 67 rather than rows of spherical bearings having spherical extremities as disclosed in FIGS. 1–4. Further, as can be seen in FIGS. 9 and 10, a bearing assembly 73 including only a single row of spherical rollers 77 can also be sealed in the same manner as the bearing assembly embodiments above discussed, the sealing embodiment disclosed being shown to be like that of FIGS. 1 and 2 and FIGS. 5 and 6.

Figure 7:
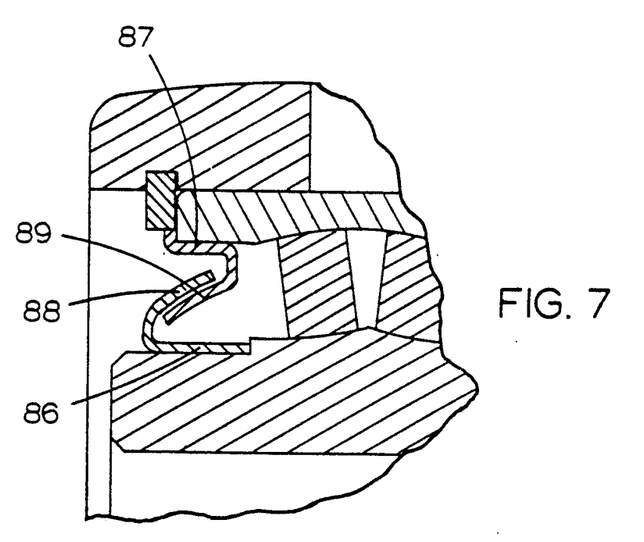
FIG. 7 is an enlarged transverse sectional view of a further modified bearing assembly sealing arrangement with overlapping spherical segments similar to those of the sealing assembly of FIG. 1 but without a compressible sealing ring therebetween and with minimal spacing between such overlapping spherical segments.
Figure 8:
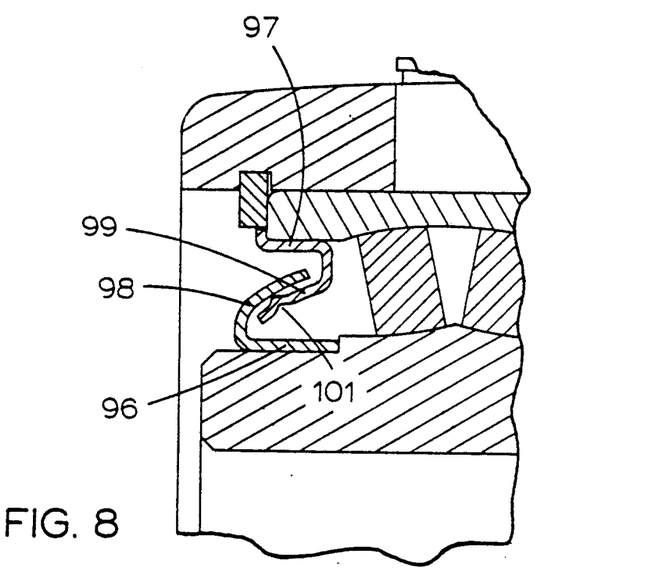
FIG. 8 is an enlarged transverse sectional view of still a further modified bearing assembly sealing arrangement with overlapping spherical segments similar to those of the sealing assembly of FIG. 1 without a compressible sealing ring therebetween but with minimal spacing between overlapping spherical segments as a result of a protuberance in one of the overlapping spherical segments.

Referring to FIG. 7 and 8 it can be seen that under certain conditions annular seals, such as annular seals 31 (FIGS. 1 and 2) and annular seals 51 (FIGS. 3 and 4) can be entirely eliminated. In FIG. 7, the overlapping end portions 88, 89 of the inner and outer sealing discs 86, 87, respectively, are shown as being spaced a minimal distance to permit relative movement therebetween but at the same time serving as sealing members to prevent infiltration of larger contaminant particles.

In FIG. 8, one of the overlapping end portions 98, 99 of the inner and outer sealing discs 96, 97, respectively, in this instance, overlapping end portion 99 of outer sealing disc 97 is provided with a concentric radially disposed and preselectively shaped protuberance 101, the face of which is spaced in adjacent proximate relation to the opposed face of the overlapping end portion 98 with a minimal preselected distance therebetween sufficient to provide a seal against undesirable, large contaminant particles and yet allow preselected radial and axial movement between the opposed faces of the spherical segments in which overlapping end portions 98 and 99 are formed.

Thus, in accordance with the present invention, a unique and novel structural sealing arrangement along with modifications thereof is provided which simultaneously allows for both axial or linear misalignment due to any one of a number of undesirable physical conditions such as changes in temperature and to angular misalignment also due to any one of a number of physical changes such as differing machinery tolerances in assembly or machinery vibrations; the sealing arrangement being easy to manufacture, assemble and maintain with a minimum use of parts and with minimum costs.

We claim:

1. A sealing arrangement for sealing at least one side of an internally self aligning bearing assembly mounted to the inner periphery of a recessed housing, said self aligning bearing assembly including axially extending and concentrically disposed spaced inner and outer race rings having bearing means disposed between opposed inner faces of said inner and outer race rings comprising:

a pair of concentrically disposed sealing members extending from opposite directions along one side of said bearing means, said sealing members being independent of and free from direct contact with said recessed housing to permit unrestrained relative axial movement of said sealing members with respect to said housing and being shaped to each having one end portion in fast relation with one of said spaced opposed inner and outer race rings and an opposite end portion extending in overlapping opposed moveable facing relation relative the end portion of said other member, said sealing member pair extending from opposite directions being so sized and the overlapping end portions of said sealing members being so shaped and relatively positioned to provide a sealing arrangement therebetween along one side of said bearing assembly capable of accommodating a preselected limit of bearing assembly axial and angular misalignment with a minimum of relative movement between said overlapped end portions of said concentrically disposed sealing members.

2. The seal arrangement of claim 1, wherein the opposed faces of said overlapping end portions of said sealing members pair are spaced in adjacent proximate relation to each other a minimal preselected distance sufficient to provide a seal and to allow preselected radial and axial movement therebetween.

3. The seal arrangement of claim 1, wherein the opposed faces of said overlapping end portions of said sealing member pair are spaced a preselected distance from each other and at least one of said overlapping end portions is provided with a concentric radially disposed and preselectively shaped protuberance minimally spaced in adjacent proximate relation to the other opposed face a minimal preselected distance sufficient to provide a seal and to allow preselected radial and axial movement between said opposed faces.

4. The seal arrangement of claim 1, wherein the opposed faces of said overlapping end portions of said sealing member pair are spaced a preselected distance from each other to provide an annular gap therebetween; and a compressible annular seal ring disposed in said annular gap, said annular seal ring being of sufficient radial thickness to provide an annular seal between said opposed faces of said overlapping end portions allowing preselected radial and axial movement therebetween.

5. The seal arrangement of claim 4, said compressible annular seal ring being fixed to one of said opposed overlapping end portion faces and moveable relative compressible felt material.

6. The seal arrangement of claim 4, said compressible annular seal ring being of compressible felt material.

7. The seal arrangement of claim 1, wherein said opposite overlapping end portions of said concentrically disposed sealing member pair are in the form of concentrically disposed spaced spherical segments having a common center and preselectively differing radii.

8. The seal arrangement of claim 7 wherein said common center falls on the axis of rotation of said bearing and is determined from a line drawn midway between said bearing means normally to said axis of rotation.

9. The seal arrangement of claim 1, said bearing assembly including two pairs of concentrically disposed sealing discs, each pair radially extending from opposite directions, said pairs of sealing discs being spaced from each other along opposite sides of said spaced race rings and being of similar mirror-image conformation.

10. The seal arrangement of claim 1, at least one of said overlapping end portions having its extremity turned a preselected distance toward the opposite end portion to limit access to the space between opposed overlapping end portions.

11. The seal arrangement of claim 1, at least one of said end portions in fast engaging relation with one of said spaced opposed race rings including a facing section to said ring.

12. The seal arrangement of claim 1, at least one of said end portions in fast engaging relation with one of said spaced opposed rings including an extremity abutting the side edge of said race ring.

13. The seal arrangement of claim 1, at least one of said end portions in fast engaging relation with one of said spaced opposed race rings including a facing section to facingly engage a section of said inner face of said ring and a turned extremity to engage the lateral side of said race ring.

14. The seal arrangement of claim 1, at least one of said spaced inner and outer race rings having an axially and radially extending protuberance abuttingly receiving along the lateral side edge thereof a turned extremity of the fastened end portion of a disc of said disc pair.

15. The seal arrangement of claim 1 at least one of said end portions of said sealing members in fast engaging relation with one of said spaced rings being turned to provide a leg member facing the inner face of said one of said spaced race rings, said faced ring having a radially and axially extending protuberance the side edge of which is engaged by said leg member extremity.

16. The seal arrangement of claim 1, at least one of said end portions of said sealing members in fast engaging relation with one of said spaced rings being turned to provide a leg member facing the inner face of said one of said spaced race rings with the extremity of said leg member being further turned to engage the lateral side of said faced race ring.

17. The seal arrangement of claim 1, at least one of said race rings having a notched lateral side between the inner and outer face thereof and one of said sealing members being turned along an adjacent edge to provide a longitudinally extending key configured to nestingly engage with said notched lateral side of said race ring.

18. The seal arrangement of claim 1, and restraining means extending from the inner periphery of said housing to limit axial movement of said sealed bearing assembly.

19. The seal arrangement of claim 18, said restraining means being positioned on either side of said sealed bearing assembly and being in the form of annular snap rings sized to snap fit in preselectively axially spaced annular grooves extending around the inner periphery of said recessed housing.

20. The seal arrangement of claim 1, said pair of concentrically disposed sealing members being disposed between said spaced opposed inner faces of said inner and outer race rings.

21. The seal arrangement of claim 1, said bearing means being in the form of spherical bearings.

22. The seal arrangement of claim 1, said bearing means being in the form of a double row of self aligning ball bearings.

23. The seal arrangement of claim 1, said bearing means being in the form of a single row of spherical roller bearings.

24. The seal arrangement of claim 1, said pair of concentrically disposed sealing members being of stamped steel.

25. A seal arrangement for sealing opposite sides of an internally self aligning spherical bearing assembly for a drive shaft mounted to the inner periphery of a recessed housing said spherical bearing assembly including axially extending and concentrically disposed spaced inner and outer race rings having spaced rows of spherical bearings disposed between opposed faces of said inner and outer race rings with said inner race ring being press fit to said drive shaft and having a longitudinal protuberance extending radially from the outer face thereof intermediate the bearing sides and said outer race ring being axially slidable relative said housing comprising;

two pairs of concentrically disposed sealing discs positioned in mirror-image spaced relation substantially within said inner faces of said spaced race rings to extend along opposite sides of the spaced rows of spherical bearings from opposite directions, each disc of each disc pair including an end portion in overlapping preselectively spaced relation with the end portion of the other disc pair and an end portion in pressfit relation with one of said spaced opposed inner and outer race rings with that disc press-fit to said outer race ring being of substantial U-shaped cross-section with the base leg thereof extending substantially normal to and between the spaced opposed inner faces of said spaced rings with one side leg extending along the inner face of said outer ring and turned at the extremity thereof to extend along the side of said outer race ring in press-fit relation with said outer race ring and the opposite side leg extending at an oblique angle from said base leg to serve as one of said overlapping end portions of said disc and with the sealing disc press-fit to said inner race ring being of V-shaped cross-section to include one leg extending along the inner face of said inner race ring with its extremity abutting the side of said longitudinally extending protuberance on said inner race ring to be in press-fit relation with said inner race ring and with the other leg serving as a spaced overlapping end portion to said other end portion formed by said leg of said other sealing disc press-fit to said outer race ring, said other end portion including a turned extremity to limit the minimal spacing between overlapping end portions, said overlapping end portions of said press-fit sealing discs being in the form of concentrically disposed spaced spherical segments having differing radii with a common center falling on the axis of rotation of said bearing and determined by a line extending midway between said rows of spherical bearings normal to said axis of rotation; and, a compressible annular sealing ring of felt material fixed to one of said opposed overlapping end portion faces and moveable relative the other face, said annular sealing ring having a center common with that of said overlapping spherical segments with a radius intermediate said differing radii of said segments.

* * * * *